Nov. 19, 1929.                J. S. LIPP                1,736,449
                              TOOL HOLDER
                        Filed March 12, 1928         2 Sheets-Sheet 1
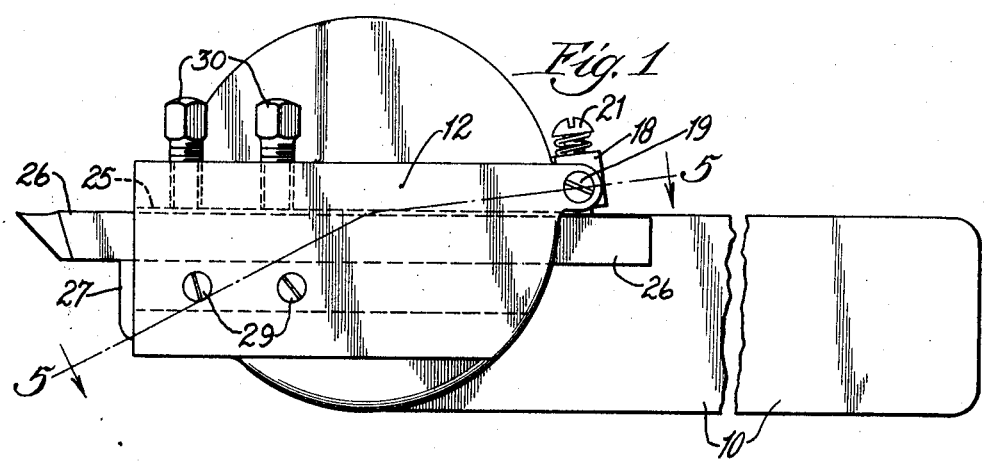
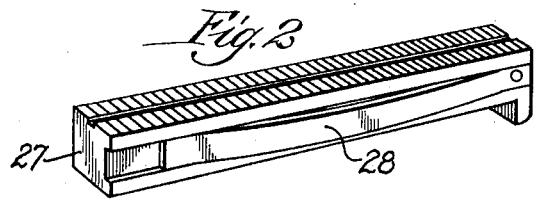
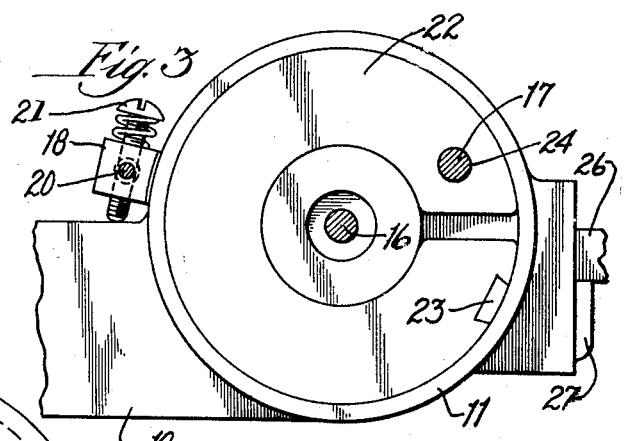
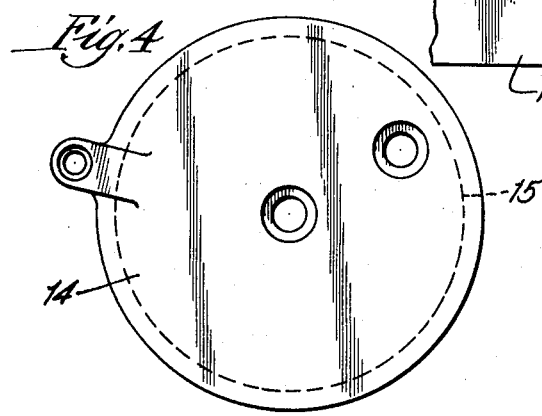
Inventor:
John S. Lipp, Nov. 19, 1929.　　　J. S. LIPP　　　1,736,449
TOOL HOLDER
Filed March 12, 1928　　2 Sheets-Sheet 2
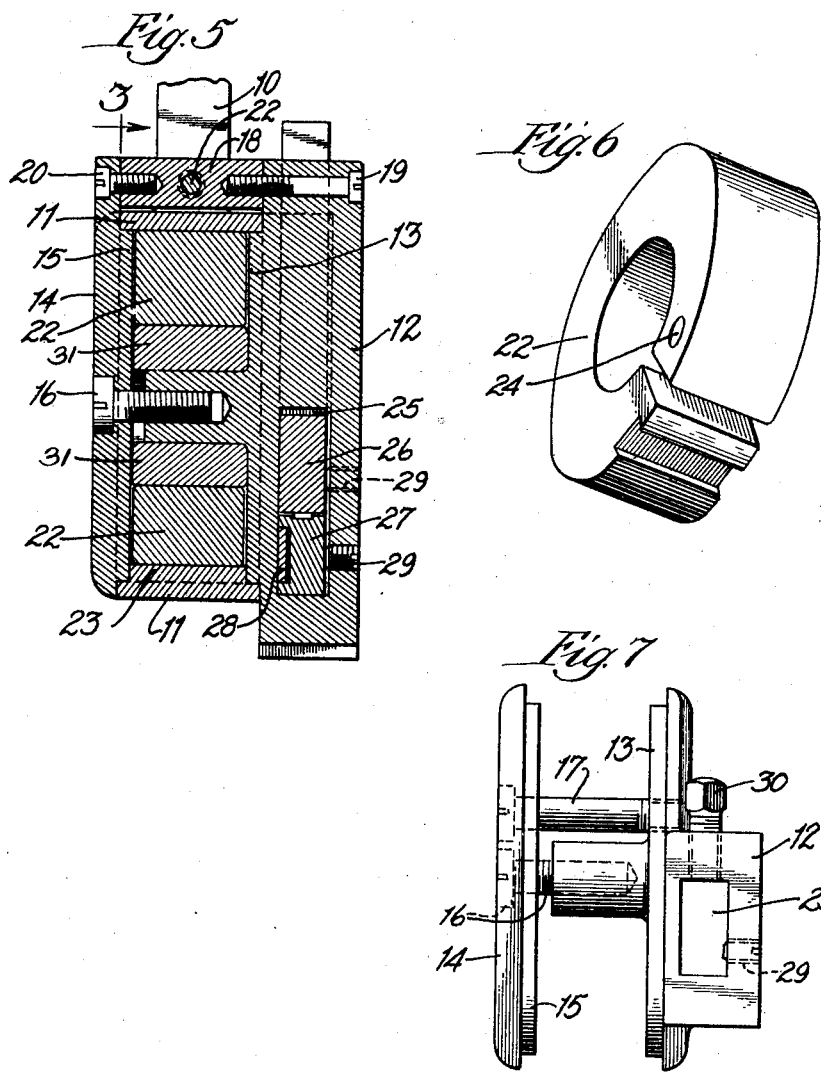

Patented Nov. 19, 1929

1,736,449

UNITED STATES PATENT OFFICE

JOHN S. LIPP, OF CHICAGO, ILLINOIS

TOOL HOLDER

Application filed March 12, 1928. Serial No. 261,027.

This invention relates to tool holders particularly such as are used for holding cutting tools for lathes, shapers, planers, screw machines and the like.

An object of this invention is to provide a tool holder of this character which will prevent the tool from chattering during the cutting operation of the lathe but which at the same time will permit the tool to yield slightly.

This and other objects which will hereinafter appear are accomplished by this invention which is fully described in the following specification and shown in the accompanying drawings, in which:

Figure 1 is a side elevation of the tool holder with a tool secured in place therein;

Fig. 2 is a perspective view of a filler bar;

Fig. 3 is a partial view of the holder on the line 3 of Fig. 5;

Fig. 4 is a side elevation of the side plate;

Fig. 5 is a section on the line 5—5 of Fig. 1;

Fig. 6 is a perspective view of the spring; and

Fig. 7 is a front end elevation of the holder with the housing, spring and tool removed.

The embodiment illustrated comprises a tool holder having a shank 10 which terminates in a housing or shell 11 which is annular in form as shown clearly in Fig. 3.

A tool holding member 12 is provided with a circular shouldered portion 13 which is adapted to fit snugly within the housing 11 but not so tight but that it can be turned therein. A plate 14, provided with a similar circular shoulder 15 which is adapted to lie within the opposite end of the housing 11 and to turn therein in a similar manner.

A screw 16 connects the plate 14 with the member 12 and the two are further connected by means of a cap-screw 17 which extends from one member to the other. The plate 14 and the member 12 are also tied together outside the housing 11 by means of a bar 18 which is secured to the member 12 by means of a cap-screw 19 and to the plate 14 by means of the cap-screw 20. This bar normally lies a short distance above the shank 10 as shown in Fig. 1 and carries an adjusting screw 21 by means of which any slackness in the tool may be taken up as will later be described.

A C-shaped spring 22 as shown in Fig. 3 is secured at one end to the housing 11 by means of a key 23, the opposite end of the spring having a hole 24 therein through which passes the screw 17. The spring 22 lies between the shouldered portions 13 and 15 as shown in Fig. 5.

The tool holding member 12 is provided with a rectangular opening 25 which is adapted to receive the cutting tool 26. This may be of a size to substantially fill the opening 25 or it may be smaller as shown in Fig. 1 in which case a filler bar 27 (Fig. 2) may be used beneath the cutting tool. This bar preferably has a spring 28 located in a recess in its side so as to prevent any unnecessary slackness. The filler bar 27 is held in place by means of set-screws 29 while the cutting tool 26 is held by means of set-screws 30 which bear down upon it from the top.

Thus it will be seen that the tool may be readily assembled or disassembled. After being assembled, the adjusting screw 21 is tightened so as to take out any play as this screw moves in the same direction that the cutting tool 26 will take when under the strain of the cutting action. Thus, during the process of cutting, the tool 26 tends to take a counter clockwise motion about the center of the screw 16, the members 12 and 14 turning with it within the housing 11. If there is any tendency of the cutting tool to chatter, it will turn slightly in a counter clockwise direction as indicated thereby lifting it and the adjusting screw from the top of the shank 10 and tending to slightly wind up the spring 22 in a clockwise direction in Fig. 3. This action even though slight will move the tool a short distance away from the work, enough to decrease the depth of the cut somewhat and the tool will then return to its normal cutting position. In this way chattering is prevented and a very much deeper cut can be taken than would be permitted by the tool if it were solidly held by the shank.

This is particularly true for deep operations in cutting off bars of considerable size.

If desired a rubber ring 31 may be used within the spring 22 as shown in Fig. 5. This also tends to tighten up the parts and to prevent any vibration which might produce a noise within the housing.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. A machine tool comprising a shank having a circular housing at one end, a tool-holding member mounted for rotary movement in said circular housing, a circular spring within said member and secured at one end to said member and at the other end to said housing, and a rubber cushion within said spring.

2. A machine tool comprising, a shank provided at one end with a housing, a tool-holding member mounted for rotary movement in said housing, said member including a plate provided with a shoulder having a bearing on said housing, and a second plate spaced from said first mentioned plate and provided with a shoulder having a bearing on said housing, and yieldable connecting means between said housing and said tool-holding member.

3. A machine tool comprising, a shank provided at one end with a housing, a tool-holding member mounted for rotary movement in said housing, said member including a plate provided with a shoulder having a bearing on said housing, and a second plate spaced from and demountably secured to said first mentioned plate and provided with a shoulder having a bearing on said housing, and yieldable connecting means between said housing and said tool-holding member.

JOHN S. LIPP.